(12) United States Patent
Okada et al.

(10) Patent No.: US 7,966,846 B2
(45) Date of Patent: Jun. 28, 2011

(54) OPTICAL FIBER DRAWING AND TWISTING APPARATUS

(75) Inventors: Kenji Okada, Sakura (JP); Koichi Harada, Sakura (JP)

(73) Assignee: Fujikura Ltd., Tokyo (JP)

( * ) Notice: Subject to any disclaimer, the term of this patent is extended or adjusted under 35 U.S.C. 154(b) by 69 days.

(21) Appl. No.: 12/540,831

(22) Filed: Aug. 13, 2009

(65) Prior Publication Data

US 2009/0303464 A1   Dec. 10, 2009

Related U.S. Application Data

(60) Division of application No. 11/471,662, filed on Jun. 21, 2006, now Pat. No. 7,845,195, which is a continuation of application No. PCT/JP2004/018879, filed on Dec. 17, 2004.

(30) Foreign Application Priority Data

Dec. 26, 2003  (JP) ................................. 2003-432264

(51) Int. Cl.
  *C03B 37/029* (2006.01)
(52) U.S. Cl. ........................................................ 65/504
(58) Field of Classification Search .................... 65/402, 65/504
  See application file for complete search history.

(56) References Cited

U.S. PATENT DOCUMENTS

| 5,298,047 A | 3/1994 | Hart, Jr. et al. |
| 5,897,680 A | 4/1999 | Geertman |
| 5,943,466 A | 8/1999 | Henderson et al. |
| 6,148,131 A | 11/2000 | Geertman |
| 6,240,748 B1 | 6/2001 | Henderson et al. |
| 6,324,872 B1 | 12/2001 | Blaszyk et al. |
| 6,550,281 B1 | 4/2003 | Hawk |
| 2003/0138230 A1 | 7/2003 | Tsurusaki et al. |
| 2004/0232571 A1* | 11/2004 | Tong et al. ................... 264/1.24 |

FOREIGN PATENT DOCUMENTS

| EP | 0 795 521 A1 | 9/1997 |
| EP | 0 785 913 B1 | 5/2000 |
| JP | 7-109150 A | 4/1995 |
| JP | 10-507438 | 7/1998 |
| JP | 2000-505413 A | 5/2000 |
| JP | 2000-344539 A | 12/2000 |
| JP | 3224235 | 10/2001 |
| JP | 2003-327445 A | 11/2003 |
| KR | 2001-0082447 A | 8/2001 |

(Continued)

OTHER PUBLICATIONS

Engineering Tolerances, (pp. 1-4) From wikipedia.org website. Nov. 16, 2009.*

(Continued)

*Primary Examiner* — John Hoffmann
(74) *Attorney, Agent, or Firm* — Sughrue Mion, PLLC

(57) ABSTRACT

An optical fiber twisting apparatus that prevents line distortion in an optical fiber undergoing a drawing process and provides a consistent coating on a bare optical fiber. This optical fiber twisting apparatus includes a twist roller apparatus that having a twist roller that, by imparting a twist to an optical fiber, imparts a twist to a molten portion of an optical fiber preform positioned on an upstream side of the optical fiber, and a support portion that supports the twist roller. The accuracy of the outer circumference of the twist roller when the twist roller is forming a part of the twist roller apparatus is 15 μm or less.

6 Claims, 8 Drawing Sheets

FOREIGN PATENT DOCUMENTS

| WO | 97-07067 | 2/1997 |
| WO | WO 97/07067 | 2/1997 |
| WO | 97-30945 | 8/1997 |
| WO | WO 97/30945 | 8/1997 |

OTHER PUBLICATIONS

"Engineering Tolerances", pp. 1-4, from Wikipedia.org website, Nov. 16, 2009.

\* cited by examiner

OPTICAL FIBER DRAWING AND TWISTING APPARATUS

CROSS REFERENCE TO RELATED APPLICATIONS

This application is a divisional application of U.S. application Ser. No. 11/471,662 filed Jun. 21, 2006. which is a continuation application of PCT Application No. PCT/JP2004/018879 filed Dec. 17, 2004. which claims priority from Japanese Patent Application No. 2003-432264 filed Dec. 26, 2003. which applications are incorporated herein by reference.

BACKGROUND OF THE INVENTION

1. Field of the Invention

The present invention relates optical fibers and fabrication of optical fibers, and more particularly, the present invention relates to an optical fiber twisting apparatus that imparts a twist to the optical fiber during the fabrication process. The present invention also relates to a method of manufacturing an optical fiber using the optical fiber twisting apparatus, and to an optical fiber manufactured using this method of manufacturing.

2. Description of the Related Art

Conventionally, an optical fiber twisting apparatus is known whereby in order to reduce polarization mode dispersion (PMD) in an optical fiber there is provided a twisting roller. When an optical fiber is being manufactured by melting and drawing an optical fiber preform, the twisting roller imparts a twist to the molten portion of the optical fiber preform positioned on the upstream side of the optical fiber by oscillating while in contact with the optical fiber.

In this optical fiber twisting apparatus, melting and drawing of an optical fiber perform is performed while a twist is imparted to a suitable location on the optical fiber while the optical fiber preform is being wiredrawn. For example, a twist is imparted to a portion of the optical fiber preform that is melted in a drawing furnace by installing an optical fiber twisting apparatus and imparting a twist to the optical fiber using the twisting roller of the apparatus in a process performed after the optical fiber preform has been melted and wiredrawn, then cooled, then primarily coated and secondarily coated (see, for example, Japanese Patent No. 3224235. the disclosure of which is incorporated herein by reference in its entirety).

The twist that is imparted to the molten portion of the optical fiber preform by this optical fiber twisting apparatus is brought about by friction between the optical fiber twisting roller and the coated portion of the optical fiber. In order to efficiently impart a twist to the optical fiber, it is possible to extend the length of a contact portion between the surface of the optical fiber twisting roller and the optical fiber. In order to extend this contact length, it is possible to increase a contact angle of the optical fiber relative to the optical fiber twisting roller, or, if a large diameter optical fiber twisting roller is used, it is possible to further increase the winding force from the optical fiber twisting roller on the coated portion of the optical fiber. (see, for example, Japanese Patent No. 3224235).

However, if the contact angle is increased, or if a large diameter optical fiber twisting roller is used, then due to the effects of the accuracy, assembly tolerances, etc. of the optical fiber twisting roller, when the optical fiber twisting roller is being swung, the pressing force of the optical fiber twisting roller on the coated portion of the optical fiber changes which results in a non-uniform force being applied to the optical fiber during the drawing process. Consequently, problems arise such as irregular movement of the optical fiber rolling over the optical fiber twisting roller, and line distortion occurring such as the optical fiber moving to the left and right over the optical fiber twisting roller, so that consistent coating of the optical fiber with the primary coated portion and the secondary coated portion is no longer possible. As a result, there are large variations in the outer diameter of the optical fiber, and the thickness of the coated portion of the optical fiber varies in the longitudinal direction of the optical fiber.

Moreover, when the optical fiber twisting roller is being swung in order to impart a twist to the optical fiber, damage is caused to the coated portion of the optical fiber where the optical fiber twisting roller makes contact due to the effects noted above. Moreover, delamination occurs at a boundary between the optical fiber glass (i.e., the bare optical fiber) and the primary coated portion, and, if the optical fiber is put in a low temperature environment after it has been laid, the attenuation of the optical fiber is increased by this delamination of the coated portion.

The present invention was conceived in view of the above described problems and aspects of exemplary embodiments of the present invention provide an optical fiber twisting apparatus that prevents line vibration occurring in an optical fiber as it is undergoing a drawing process, making it possible to coat a bare optical fiber with consistency, and preventing damage to the coated portion of the optical fiber where the optical fiber twisting roller makes contact. Other aspects provide a method of manufacturing an optical fiber in which an optical fiber is manufactured using this optical fiber twisting apparatus.

SUMMARY OF THE EXEMPLARY EMBODIMENTS

Illustrative, non-limiting embodiments of the present invention overcome various disadvantages. In addition, the present invention is not required to overcome these disadvantages, and an illustrative, non-limiting embodiment of the present invention may not overcome any disadvantages.

Illustrative, non-limiting embodiments of the present invention provide apparatuses and methods for an optical fiber twisting apparatus that include a twist roller that, by imparting a twist to an optical fiber, imparts a twist to a molten portion of an optical fiber preform that is positioned on an upstream side of the optical fiber; and a restle apparatus that supports the twist roller, wherein an accuracy of an outer circumference of the twist roller is about 15 µm or less.

According to illustrative, non-limiting embodiments, it is possible to prevent line distortion occurring in an optical fiber undergoing a drawing process, and it is possible to consistently coat a bare optical fiber, and to prevent damaging the coated portion of an optical fiber where the optical fiber twisting roller makes contact. It is also possible to prevent an increase in attenuation of an optical fiber caused by delamination of the coated portion of the optical fiber, even when the optical fiber is installed in a low temperature environment.

Illustrative, non-limiting embodiments of the present invention also provide a method of determining accuracy of a twist roller of the above-described optical fiber twisting apparatus. In the method, runout of the outer circumference of the twist roller while the twist roller is rotated is measured, a maximum runout "e" and a minimum runout "f" of the outer circumference of the twist roller are determined; and the accuracy is determined as the value of $(e-f)/2$.

Illustrative, non-limiting embodiments of the present invention also provide a method of manufacturing an optical fiber that includes drawing a bare optical fiber formed by melting and then drawing an optical fiber preform, coating the bare optical fiber to form a coated optical fiber, and twisting the coated optical fiber wherein the aforementioned optical fiber twisting apparatus is placed against a portion of an outer circumference of the coated optical fiber and is made to oscillate, so that a twist is imparted to the coated optical fiber, resulting in a twist being imparted to the molten portion of the optical fiber preform.

Additional illustrative, non-limiting embodiments of the present invention also provide an optical fiber manufactured using the above method of manufacturing an optical fiber.

BRIEF DESCRIPTION OF THE DRAWINGS

These and other aspects and advantages of the invention will become apparent and more readily appreciated from the following description of exemplary embodiments, taken in conjunction with the accompanying drawing figures of which.

DETAILED DESCRIPTION OF THE EXEMPLARY EMBODIMENTS

An exemplary embodiment of the present invention will now be described with reference made to the accompanying drawings.

Figure 1:
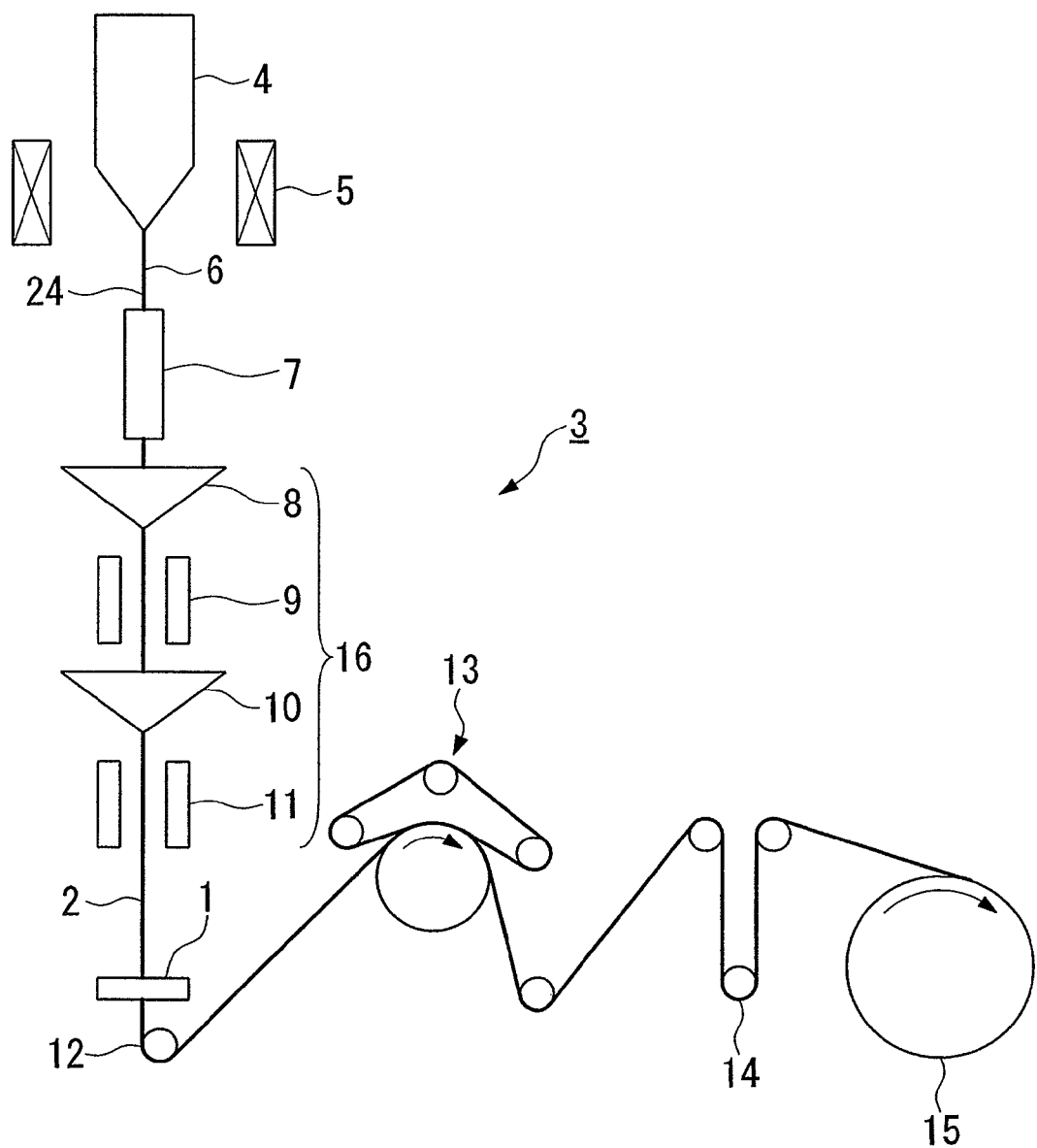
FIG. 1 is a schematic view illustrating a drawing apparatus according to an exemplary embodiment of the present invention.

FIG. 1 is a schematic view illustrating a drawing apparatus according to an exemplary embodiment of the present invention. FIG. 1 illustrates a drawing apparatus 3 that manufactures an optical fiber 2 using the optical fiber twisting apparatus 1 according to an exemplary embodiment of the present invention.

The drawing apparatus 3 according to an exemplary embodiment of the present invention is provided with a drawing furnace 5 (i.e., a drawing furnace) that heats an optical fiber preform 4 formed from quartz-based glass or the like so as to melt and wiredraw the optical fiber preform 4. A cooling jacket 7 provided on a downstream side of the drawing furnace 5 cools a bare optical fiber 6 that has been formed by drawing. A first primary coater 8 is provided on a downstream side of the cooling jacket 7 to apply a primary coating material to the bare optical fiber 6 that has been cooled by the cooling chamber 7. A first bridging cylinder 9 irradiates ultraviolet rays to cure the coated primary coating material. A second primary coater 10 applies a secondary coating material to the optical fiber that has received a primary coating. A second bridging cylinder 11 irradiates ultraviolet rays to cure the coated secondary coating material. An optical fiber twisting apparatus 1 is provided on a downstream side of the second bridging cylinder 11 and imparts a twist to the portion of the optical fiber preform 4 that has been melted in the drawing furnace 5 by applying a twist to an optical fiber 2 that has received the secondary coating. A turn pulley 12 is provided downstream from the optical fiber twisting apparatus 1 to change the direction of movement of the optical fiber 2. A conveying tool 13 (described below) pulls the optical fiber preform 4. A dancer 14 adjusts the number of revolutions of a winding tool 15 (described below), onto which the optical fiber 2 is wound. A coating mechanism 16 is formed by the first primary coater 8, the first bridging cylinder 9, the second primary coater 10, and the second bridging cylinder 11.

The optical fiber preform 4 used in an exemplary embodiment of the present invention may be manufactured using a number of methods, for example, but not limited to, a vapor-phase axial method (i.e., a VAD method), an external deposition method (i.e., an OVD method), an inner deposition method (i.e., a CVD method, a MCVD method, or a PCVD method), or a rod-in-tube method.

The optical fiber 2 manufactured using the optical fiber manufacturing method according to an exemplary embodiment of the present invention may be one of a variety of optical fiber, for example, but not limited to, a single mode optical fiber, a dispersion shifted optical fiber, a cut-off shifted optical fiber, and a dispersion slope compensating optical fiber. The optical fiber twisting apparatus 1 used in an exemplary embodiment of the present invention may be an optical fiber twisting apparatus of the type that is described in, for example, Japanese Patent No.3224235. FIGS. 1, 4, and 6.

The optical fiber twisting apparatus that is described in FIG. 1 of Japanese Patent No. 3224235 (referred to below as Apparatus A) is formed by a single twisting roller apparatus 25 such as that shown in FIG. 2B. This twisting roller apparatus 25 is provided with a trestle 20 having a top surface that serves as a reference surface 19, a support portion 21 that extends in a perpendicular direction from the reference surface 19, and a single twist roller 22 supported by the support portion 21 and that, when drawing the optical fiber preform 4 to form an optical fiber 2, oscillates while in contact with a portion of the optical fiber 2 to impart a twist to the molten portion of the optical fiber preform 4. By causing a rotation shaft 23 of the twist roller 22 to oscillate, the twist roller 22 is made to oscillate while in contact with the optical fiber 2, thereby imparting a twist to the optical fiber 2 as it is undergoing a drawing process. In addition, the trestle 20 and the support portion 21 constitute a trestle apparatus 28.

The optical fiber twisting apparatus that is described in FIG. 6 of Japanese Patent No. 3224235 (referred to below as Apparatus B) is provided with a pair of the same twist roller apparatuses 25 as those in Apparatus A, and imparts a twist to an optical fiber that is sandwiched between the pair of twist rollers 22 of the pair of twist roller apparatuses 25. As a result of each of the pair of twist rollers 22 rotating, the optical fiber is pulled towards the downstream side, and a pair of trestles 20 of the pair of twist roller apparatuses 25 each oscillate in a direction that is perpendicular to the direction in which the optical fiber extends and also in the opposite direction from each other. Accordingly, as a result of the pair of twist rollers 22 oscillating while in contact with the optical fiber, the optical fiber is rotated and a twist is generated in the optical fiber.

The optical fiber twisting apparatus that is described in FIG. 4 of Japanese Patent No. 3224235 (referred to below as Apparatus C) imparts a twist to an optical fiber that is sandwiched between the pair of twist rollers 22 of the pair of twist roller apparatuses 25 in the same way as in Apparatus B. This pair of twist rollers 22 rotate in the direction in which the optical fiber extends and also move in the opposite direction from each other.

Figure 2A:
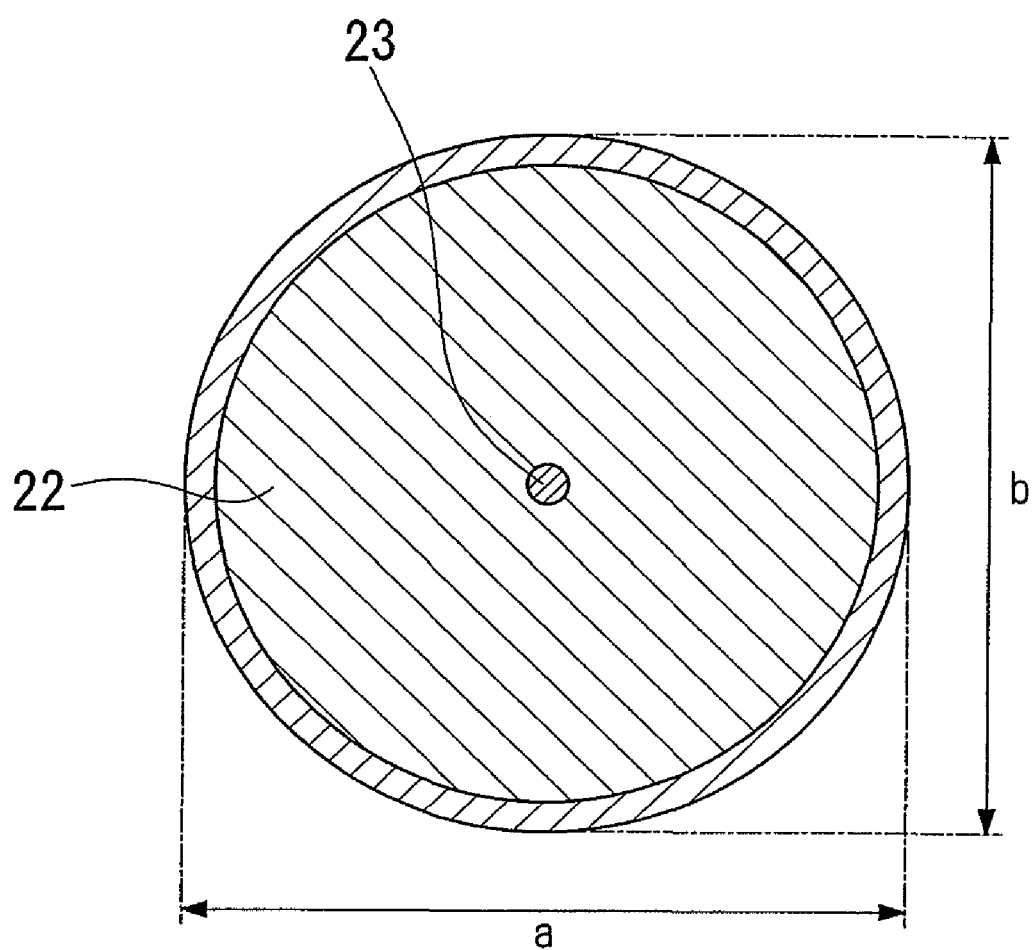
FIG. 2A is a view illustrating measurement of the accuracy of an outer circumference of a twisting roller according to an exemplary embodiment of the present invention.
Figure 2B:
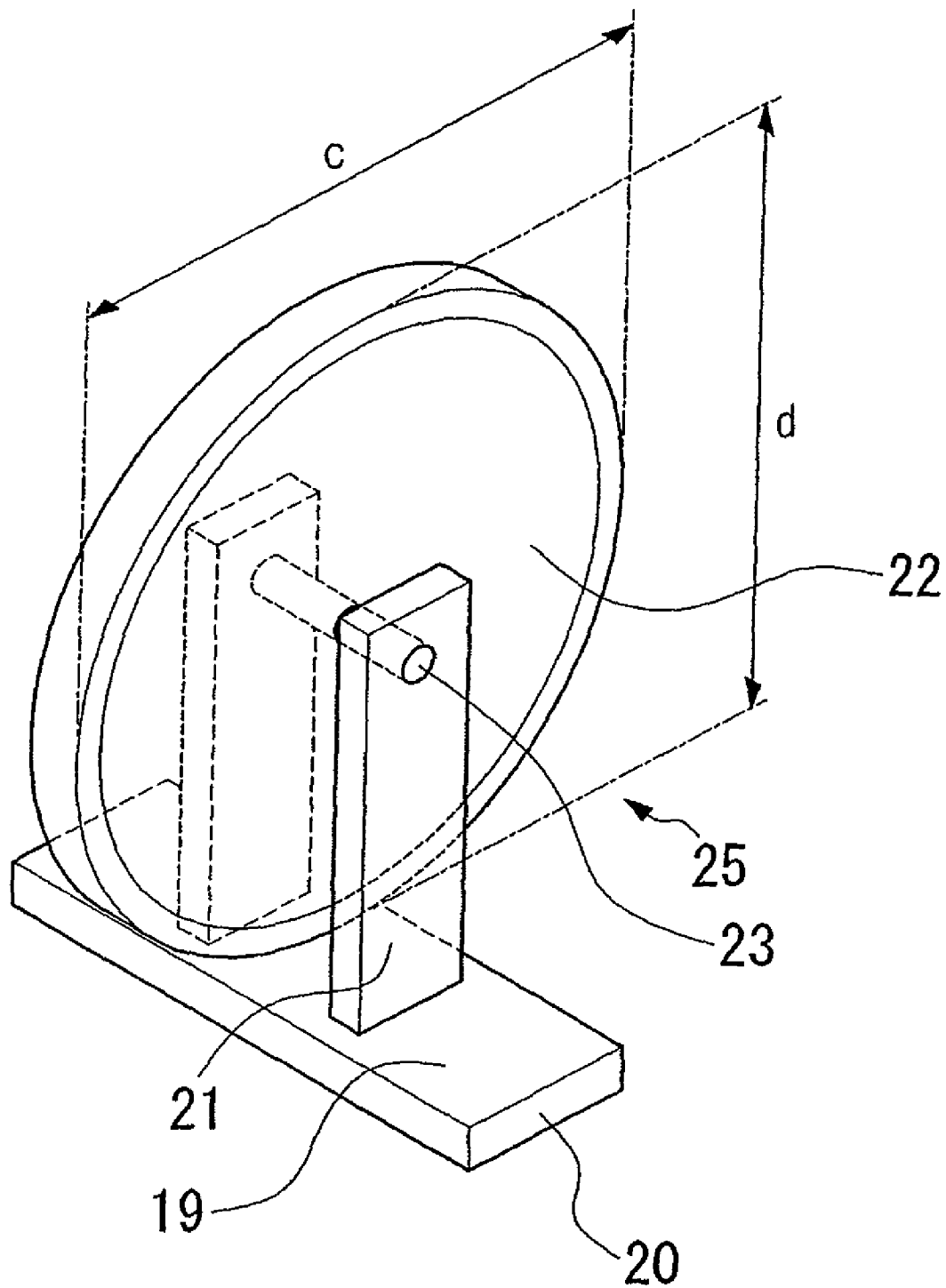
FIG. 2B is a perspective view illustrating measurement of the accuracy of an outer circumference of a twisting roller as part of the twist roller apparatus of an exemplary embodiment of the present invention.

A measurement of the accuracy of the outer circumference of the twist roller (i.e., a twist roller unit) 22 in an exemplary embodiment of the present invention is shown in FIG. 2A.

The outer diameter of the twist roller 22 is measured over the entire outer circumference of the twist roller 22, and a maximum value measured for the outer diameter is set as "a", while a minimum value measured for the outer diameter is set as "b". Note that in the case of an elliptical twist roller, the minimum value "b" is taken as the outer diameter of the twist roller in a direction perpendicular to the outer diameter where the maximum value "a" is measured. However, the twist roller is not limited to having an elliptical shape and there may also be cases where the maximum value "a" measured for the outer diameter and the minimum value "b" measured for the outer diameter are not in a perpendicular direction. The value |(a−b)/2| is taken as the accuracy of the outer diameter of the twist roller 22.

Next, a description will be given, with reference made to FIGS. 2B, 3A to 3C, 4A to 4D, and 5, of the measurement of the accuracy of the outer circumference of the twist roller 22 when it forms the twist roller apparatus 25 of an exemplary embodiment of the present invention.

Figure 3A:
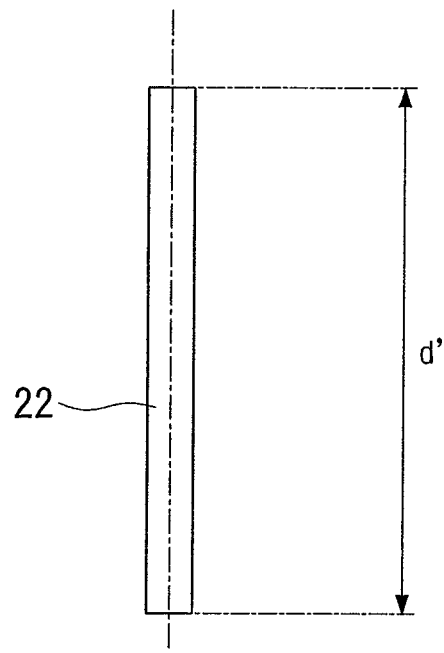
FIG. 3A is an end view illustrating measurement of the accuracy of an outer circumference of a twisting roller according to an exemplary embodiment of the present invention.
Figure 3B:
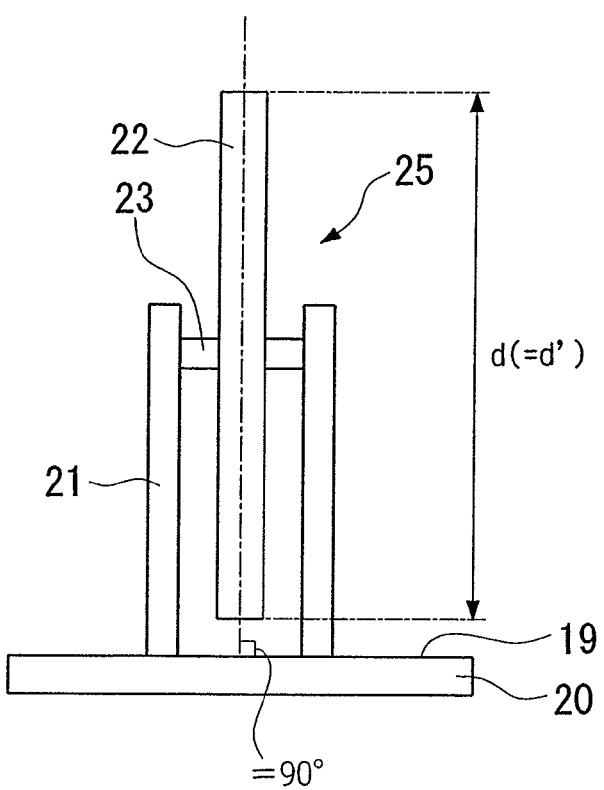
FIG. 3B is an end view illustrating measurement of the accuracy of an outer circumference of a twisting roller as part of the twist roller apparatus according to an exemplary embodiment of the present invention.

As is shown in FIG. 3A, a minimum value of the outer diameter of the twist roller (i.e., a twist roller unit) 22 is taken as "d'", while a length of this outer diameter projected onto a surface that is perpendicular to the reference surface is taken as "d". As shown in FIG. 3B, when the twist roller apparatus 25 is constructed with precision, namely, when the support portion 21 is positioned in a direction that is perpendicular to the reference surface 19, and when the rotation shaft 23 is positioned in a direction that is perpendicular to the support portion 21 (i.e., in a horizontal direction relative to the reference surface 19), and when the twist roller 22 is positioned in a direction that is perpendicular to the rotation shaft 23 (i.e., in a horizontal direction relative to the support portion 21), then d=d'. The term "surface that is perpendicular to the reference surface," such as is described above, refers to a surface that is orthogonal to the rotation shaft 23 when, as is described above, the twist roller is constructed with precision (i.e., when the rotation shaft 23 is set in a horizontal direction relative to the reference surface 19).

Figure 3C:
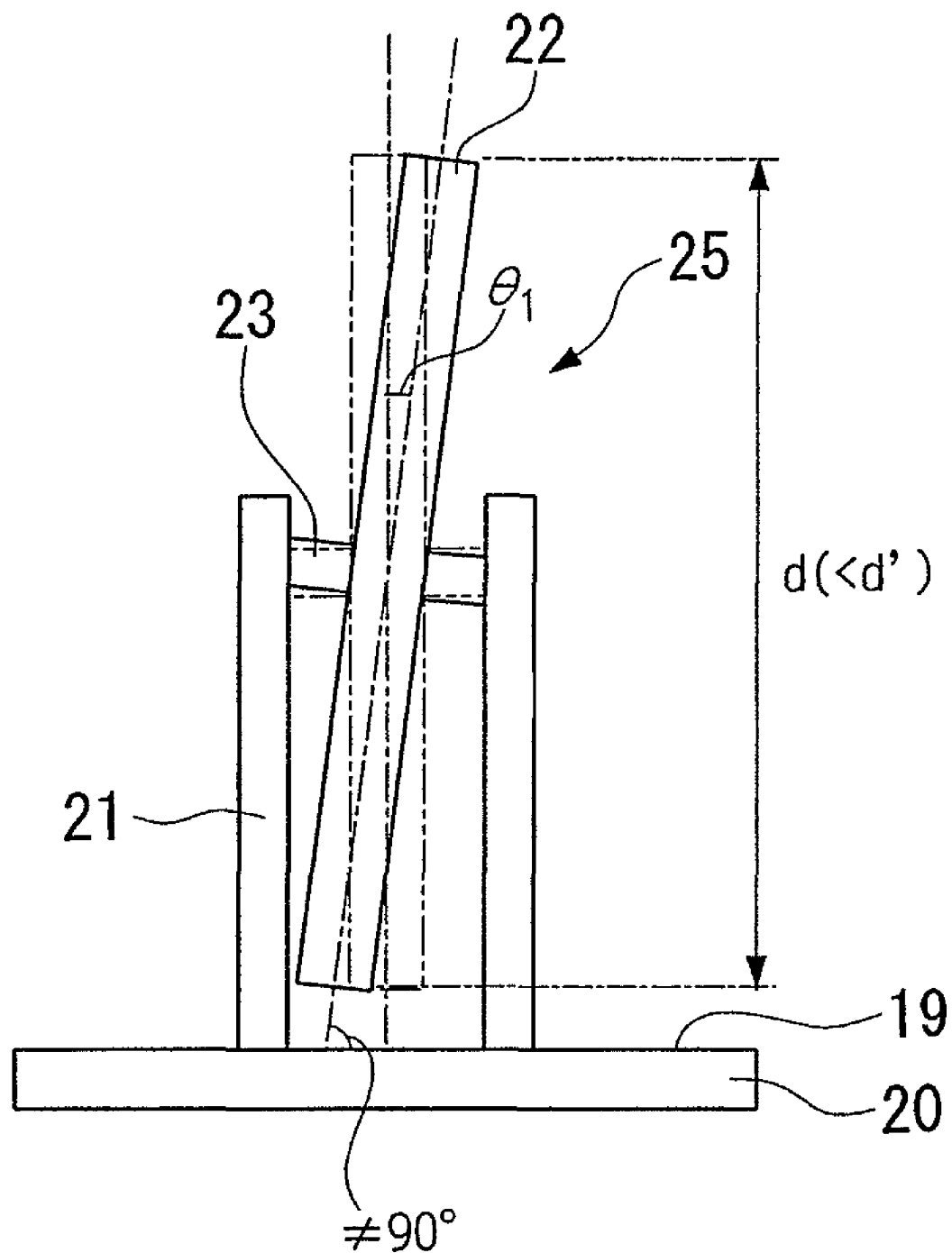
FIG. 3C is another end view illustrating measurement of the accuracy of an outer circumference of a twisting roller as part of the twist roller apparatus according to an exemplary embodiment of the present invention.

However, as shown in FIG. 3C, in cases when the twist roller apparatus 25 is not constructed with precision, for example, when the rotation shaft 23 is not being perpendicularly relative to the support portion 21, the twist roller 22 is not set perpendicularly relative to the reference surface 22, then d<d'. Note that the value of "d" becomes smaller as the tilt of the twist roller 22 increases, such as when the angle $\theta_1$ of the twist roller 22 relative to a direction that is perpendicular to the reference surface 19 increases.

Figure 4A:
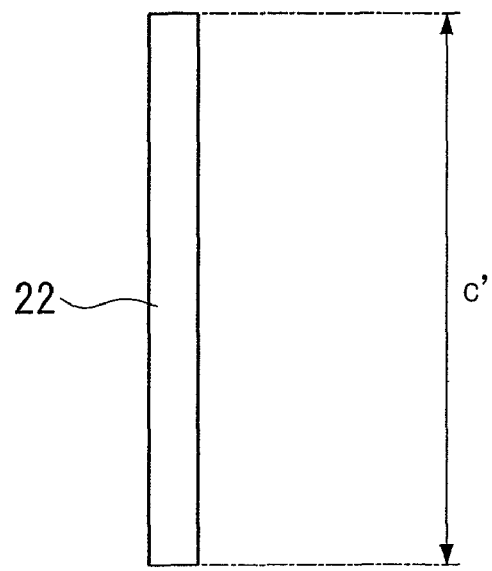
FIG. 4A is a top view illustrating measurement of the accuracy of an outer circumference of a twisting roller according to an exemplary embodiment of the present invention.
Figure 4B:
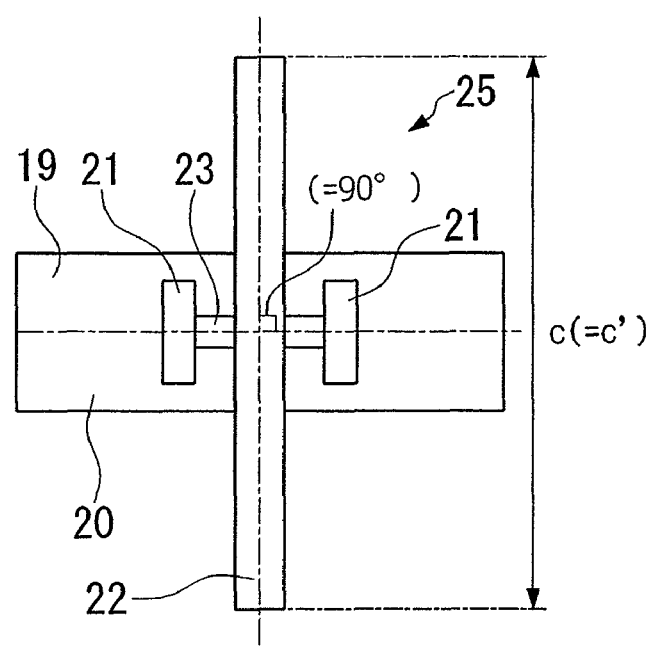
FIG. 4B is a top view illustrating measurement of the accuracy of an outer circumference of a twisting roller as part of the twist roller apparatus according to an exemplary embodiment of the present invention.
Figure 4C:
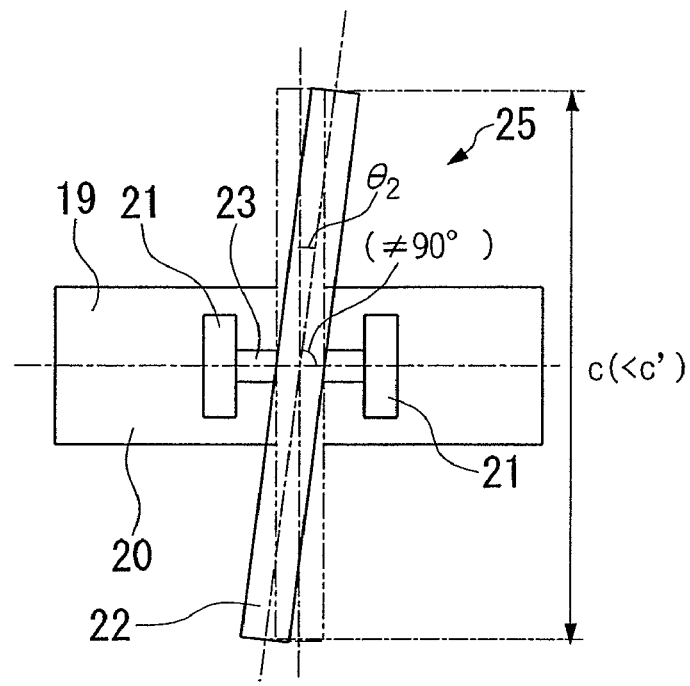
FIG. 4C is another top view illustrating measurement of the accuracy of an outer circumference of a twisting roller as part of the twist roller apparatus according to an exemplary embodiment of the present invention.
Figure 4D:
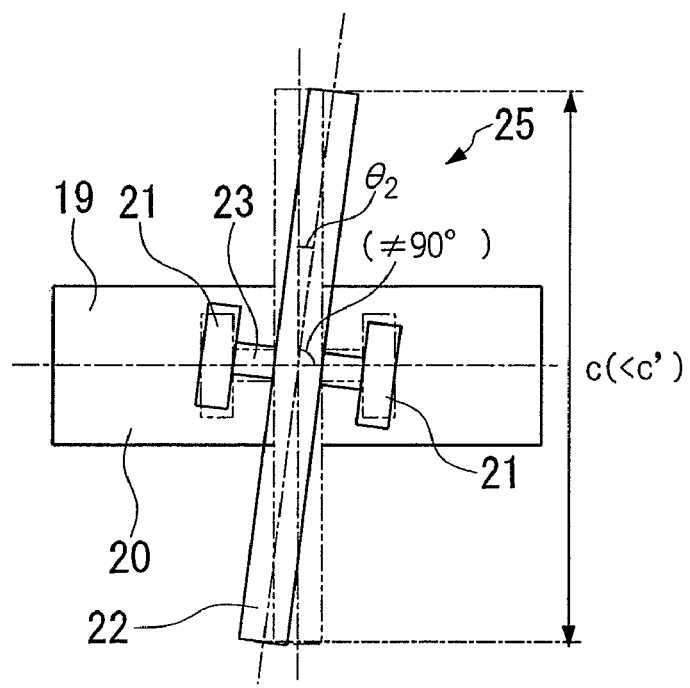
FIG. 4D is another top view illustrating measurement of the accuracy of an outer circumference of a twisting roller as part of the twist roller apparatus according to an exemplary embodiment of the present invention.

As shown in FIGS. 4A to 4D, a maximum value of the outer diameter of the twist roller (i.e., a twist roller unit) 22 is taken as "c'", while a length of the outer diameter projected onto a surface perpendicular to the reference surface is taken as "c." As shown in FIG. 4B, when the twist roller apparatus 25 is constructed with precision, then c=c'. However, when, as shown in FIG. 4C, the twist roller 22 is not perpendicular relative to the reference surface 22, or, as shown in FIG. 4D, the support portion 21 is not attached with precision relative to the trestle 20, then c<c'. Note that the value of "c" becomes smaller as the tilt of the twist roller 22 increases, such as when the angle $\theta_2$, which is the angle of the twist roller 22 relative to a direction that is perpendicular to the direction in which the reference surface 19 extends, increases.

Note that the maximum value "c" and the minimum value "d" of the length of the twist roller 22 outer diameter projected onto a surface perpendicular to the reference surface are determined by the maximum value "c'" and the minimum value "d'" of the outer diameter of the twist roller (i.e., a twist roller unit) 22, and by the tilt of the twist roller 22.

At a position where the outer diameter of the twist roller (i.e., the twist roller unit) 22 is at the minimum value, the length "d" of the outer diameter of the twist roller 22 projected onto a surface perpendicular to the reference surface is also at the minimum value, and at a position where the outer diameter of the twist roller (i.e., the twist roller unit) 22 is at the maximum value, the length "c" of the outer diameter of the twist roller 22 projected onto a surface perpendicular to the reference surface is also at the maximum value.

For the reasons described above, the accuracy of the outer circumference of the twist roller 22 when it is forming a part of a twist roller apparatus 25 as described below may not be the same as the accuracy of the outer circumference of the twist roller 22 unit.

Due to, for example, discrepancies in the accuracy of the outer circumference of the twist roller 22 unit or to looseness in the various bearings, the position on the surface of the outer circumference of the twist roller 22 in contact with the optical fiber 2 changes. Therefore, as described below, the accuracy of the outer circumference of the twist roller 22 after it has been assembled to form a part of the twist roller apparatus 25 is measured in the following manner, as illustrated in FIG. 5.

Figure 5:
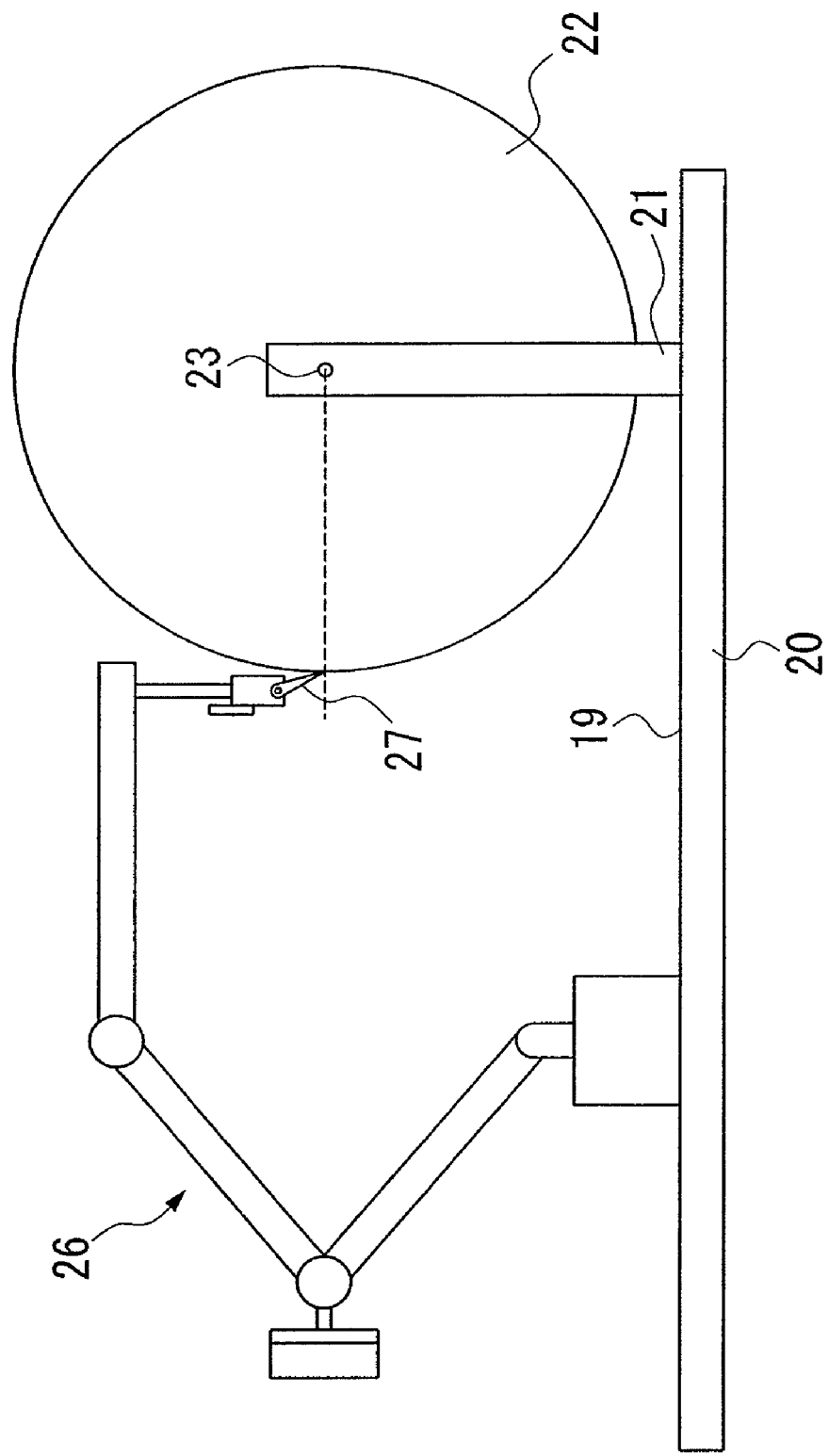
FIG. 5 is a view illustrating measurement of the accuracy of an outer circumference of a twisting roller according to an exemplary embodiment of the present invention.

As illustrated in FIG. 5, a micro gauge 26 is set on the reference surface 19. A measuring needle 27 of the micro gauge 26 is set to the same height (i.e., distance) from the reference surface 19 as the height (i.e., distance) of the rotation shaft 23 from the reference surface 19, and is matched to the center of the direction towards the rotation shaft 23 of the twist roller 22, and is set to a zero point.

Next, the twist roller 22 is rotated and the amplitude of the oscillation (which is in a transverse direction when viewing FIG. 5) of the measuring needle 27 of the micro gauge 26 is measured. The maximum value of this oscillation is taken as "e1," while the minimum value thereof is taken as "f1". The value (e1−f1)/2 is then defined as the accuracy at the center of the outer circumference of the twist roller 22 when it forms a part of the twist roller apparatus 25.

In addition to measuring at the center of the twist roller 22, the oscillation amplitude of the measuring needle 27 of the micro gauge 26 is measured at both ends of the twist roller 22 in the direction of the rotation shaft 23 of the outer circumferential surface of the twist roller 22. The maximum measurement value taken at one end is "e2" and the minimum measurement value taken at this end is "f2," while the maximum measurement value taken at the other end is "e3" and the minimum measurement value taken at this other end is "f3." The value (e2−f2)/2 is then defined as the accuracy at the one end of the outer circumference of the twist roller 22 when it forms a part of the twist roller apparatus 25, while (e3−f3)/2 is then defined as the accuracy at the other end of the outer circumference of the twist roller 22 when it forms a part of the twist roller apparatus 25.

The largest value of the defined values (e1−f1)/2, (e2−f2)/2, and (e3−f3)/2 is then defined as the accuracy (e−f)/2 of the outer circumference of the twist roller 22 when it forms a part of the twist roller apparatus 25.

EXAMPLES

Results of various experiments that were performed for three optical fiber twisting apparatuses (Apparatuses A, B, and C) are shown in Table 1 as the Examples of the present invention.

TABLE 1

| Optical fiber twisting apparatus | | (e − f)/2 (μm) | (a − b)/2 (μm) | Line distortion | Warm water immersion delamination |
|---|---|---|---|---|---|
| A | Example 1 | 5 | 5 | Good | Good |
| | | 10 | 5 | Good | Good |
| | | 15 | 5 | Good | Good |
| | | 15 | 10 | Good | Good |
| | | 15 | 15 | Good | Good |
| | Comparative example 1 | 20 | 5 | Bad | Good |
| | | 20 | 10 | Bad | Good |
| | | 30 | 10 | Bad | Good |
| | | 30 | 15 | Bad | Good |
| | | 45 | 15 | Bad | Good |
| | | 20 | 20 | Bad | Good |
| | | 30 | 20 | Bad | Good |
| B | Example 2 | 5 | 5 | Good | Good |
| | | 10 | 5 | Good | Good |
| | | 15 | 5 | Good | Good |
| | | 15 | 10 | Good | Good |
| | | 15 | 15 | Good | Good |
| | Comparative example 2 | 20 | 5 | Bad | Bad |
| | | 20 | 10 | Bad | Bad |
| | | 30 | 10 | Bad | Bad |
| | | 30 | 15 | Bad | Bad |
| | | 45 | 15 | Bad | Bad |
| | | 20 | 20 | Bad | Bad |
| | | 30 | 20 | Bad | Bad |
| C | Example 3 | 5 | 5 | Good | Good |
| | | 10 | 5 | Good | Good |
| | | 15 | 5 | Good | Good |
| | | 15 | 10 | Good | Good |
| | | 15 | 15 | Good | Good |
| | Comparative example 3 | 20 | 5 | Bad | Bad |
| | | 20 | 10 | Bad | Bad |
| | | 30 | 10 | Bad | Bad |
| | | 30 | 15 | Bad | Bad |
| | | 45 | 15 | Bad | Bad |
| | | 20 | 20 | Bad | Bad |
| | | 30 | 20 | Bad | Bad |

The conditions common to all three optical fiber twisting apparatuses (i.e., Apparatuses A, B, and C) are described below.

Common conditions
Optical fiber outer diameter: 125 μm
Coating material: Urethane acrylate based ultraviolet curable resin (both primary and secondary coatings)
Coating diameter (Optical fiber outer diameter): 250 μm
Drawing line speed: 1200 m/min
Twist roller diameter: 100 mm
Oscillation angle when twist roller is oscillating: 10°

Delamination of the coated portion was confirmed by immersing one meter of the manufactured optical fiber for twelve hours in warm water at 60° C., and then, within five minutes after extraction, observing the extracted one meter of optical fiber using an optical microscope.

Example 1

Using the optical fiber twisting apparatus described in FIG. 1 of Japanese Patent No. 3224235 (i.e., Apparatus A), by adjusting the optical fiber twisting apparatus and using twist rollers in which the values of the accuracy of the outer circumference (a−b)/2 of the twist roller were 5, 10, and 15 μm, the accuracy of the outer circumference of the twist roller when it formed a part of the twist roller apparatus was set such that (e−f)/2 was 5, 10, and 15 μm. When the actual drawing was performed and the line distortion was confirmed, no line distortion occurred in the optical fiber during the manufacturing of the optical fiber, which resulted in a consistent coating being provided. Moreover, excellent results were obtained in the warm water delamination test of the manufactured optical fiber. Example 1 in Table 1 indicates the test results.

Comparative Example 1

Using Apparatus A again, (e−f)/2 was set so as to be 20, 30, and 45 μm by adjusting the optical fiber twisting apparatus. When the actual drawing was performed and the line distortion was confirmed, irrespective of whether the twist roller having a value for (a−b)/2 of 5, 10, 15, or 20 μm was used, if (e−f)/2 exceeded 15 μm, then line distortion in the optical fiber was generated when the optical fiber was being manufactured, which resulted in an inability to provide a consistent coating on the optical fiber. In the warm water delamination test of the manufactured optical fiber using a single twist roller, delamination of the coated portion of the optical fiber was not observed. Comparative example 1 in Table 1 indicates the test results.

Example 2

Using the optical fiber twisting apparatus described in FIG. 4 of Japanese Patent No. 3224235 (i.e., Apparatus B), when experiments were performed under the same conditions as in Example 1 (i.e., (e−f)/2 was 5, 10, and 15 μm), excellent results were obtained for line distortion and warm water immersion delamination. Example 2 in Table 1 indicates the test results.

Comparative Example 2

Using Apparatus B, when experiments were performed under the same conditions as in Comparative example 1 (i.e., (e−f)/2 was 20, 30, and 45 μm), line distortion tended to occur. Moreover, in Apparatus B, in the warm water delamination test of the manufactured optical fiber using a pair of twist rollers, delamination of the coated portion of the optical fiber was observed. Comparative example 2 in Table 1 indicates the test results.

Example 3

Using the optical fiber twisting apparatus described in FIG. 6 of Japanese Patent No. 3224235 (i.e., Apparatus C), when experiments were performed under the same conditions as in Example 1 (i.e., (e−f)/2 was 5, 10, and 15 μm), excellent results were obtained for line distortion and warm water immersion delamination. Example 3 in Table 1 indicates the test results.

Comparative Example 3

Using Apparatus C, when experiments were performed under the same conditions as in Comparative example 1 (i.e., (e−f)/2 was 20, 30, and 45 μm), line distortion tended to occur. Moreover, in the warm water delamination test, delamination of the coated portion of the optical fiber was observed. Comparative example 3 in Table 1 indicates the test results.

As is evident from the results shown in Table 1, in all of the apparatuses A, B, and C, when the accuracy (e−f)/2 of the outer circumference of the twist roller when it formed a part of the twist roller apparatus was 15 μm or less, excellent results were obtained for both the line distortion and the warm water immersion delamination test.

Note that, here, describing the result of the line distortion as being excellent infers the following. In Apparatus A, because a single twist roller is oscillated and the optical fiber is rolled over the top of the twist roller, line distortion is generated because of the mechanism adjacent to the twist roller. A line distortion inhibiting pulley formed with a V groove shape is installed directly above the twist roller in order to inhibit this line distortion. In this case, line distortion is essentially inhibited by this V groove-shaped pulley. However, if the precision with which the twist roller has been assembled is poor, then the optical fiber vibrates directly above the line distortion inhibiting pulley in a direction perpendicular to the drawing direction of the optical fiber with the pulley acting as a projection. If the amplitude of this vibration is within two optical fiber diameters (for example, 0.5 mm in the case of optical fibers having a diameter of 250 μm) on an optical fiber position detector, then it is determined to be "Good" with no line distortion. If the vibration amplitude is greater than this, then it is determined as being "Bad" with poor line distortion. For Apparatuses B and C, the line distortion inhibiting pulley that was used in Apparatus A was not used. When the amount of oscillation in a direction perpendicular to the drawing direction of the optical fiber directly above a pair of twist rollers was within two optical fibers, then it was determined to be "Good," while in all other cases, it was determined to be "Bad."

In the case of the results of the warm water immersion delamination test, if delamination was not observed in the observation of the optical fiber after it had been immersed, then it was determined to be "Good," while if delamination was observed in one or more locations then it was determined to be "Bad."

Moreover, if the accuracy (e−f)/2 of the outer circumference of the twist roller when it forms a part of the twist roller apparatus and the accuracy (a−b)/2 of the outer circumference of the twist roller are both 15 μm or less, then excellent results are obtained for the line distortion and the warm water immersion delamination test.

While the present invention has been particularly shown and described with reference to exemplary embodiments thereof, it will be understood by those skilled in the art that various changes in form and details may be made therein without departing from the spirit and scope of the present invention as defined by the appended claims.

The invention claimed is:

1. An optical fiber twisting apparatus comprising:
 a fiber drawing furnace;
 a trestle apparatus; and
 a twist roller for twisting a fiber as it is being drawn, which is supported by the trestle apparatus,
 wherein the twist roller comprises an outer circumference comprising a first edge spaced apart from a second edge, and
 wherein an accuracy (e−f)/2 of the outer circumference of the twist roller when the twist roller is supported by the trestle apparatus is 15 μm or less, where e is a maximum value of an oscillation of a measuring needle of a micro gauge when the twist roller is rotated and measured using the micro gauge, while f is a minimum value of the oscillation of the measuring needle of the micro gauge when the twist roller is rotated and measured using the micro gauge.

2. The optical fiber twisting apparatus according to claim 1, wherein the trestle apparatus includes a trestle comprising a top surface as a reference
surface, and a support portion extending perpendicularly from the reference surface, and
the twist roller includes a rotation shaft, and a disk having outer circumference concentric
with the rotation shaft, and
wherein the accuracy of the outer circumference of the twist roller when the rotation shaft is supported by the support portion is 15 μm or less.

3. The optical fiber twisting apparatus according to claim 1, wherein the outer circumference of the twist roller has a maximum diameter and a minimum diameter.

4. The optical fiber twisting apparatus according to claim 1, wherein the twist roller comprises an elliptical shape.

5. The optical fiber twisting apparatus according to claim 4, wherein the maximum diameter of the twist roller is measured perpendicular to minimum diameter of the twist roller.

6. The optical fiber twisting apparatus according to claim 1, wherein the twist roller comprises two twist rollers.

* * * * *